United States Patent
Marino et al.

(10) Patent No.: US 7,759,894 B2
(45) Date of Patent: Jul. 20, 2010

(54) COGLESS MOTOR DRIVEN ACTIVE USER INTERFACE HAPTIC FEEDBACK SYSTEM

(75) Inventors: Mark G. Marino, Petoskey, MI (US); John K. Tillotson, Petoskey, MI (US); Danial L. Kosht, Gaylord, MI (US)

(73) Assignee: Honeywell International Inc., Morristown, NJ (US)

( * ) Notice: Subject to any disclaimer, the term of this patent is extended or adjusted under 35 U.S.C. 154(b) by 565 days.

(21) Appl. No.: 11/775,636

(22) Filed: Jul. 10, 2007

(65) Prior Publication Data

US 2008/0142642 A1    Jun. 19, 2008

Related U.S. Application Data

(60) Provisional application No. 60/854,763, filed on Oct. 26, 2006, provisional application No. 60/854,764, filed on Oct. 26, 2006, provisional application No. 60/859,389, filed on Nov. 14, 2006.

(51) Int. Cl.
*B25J 9/18* (2006.01)
*G05B 19/24* (2006.01)

(52) U.S. Cl. ............... 318/568.11; 318/560; 318/561; 318/609; 318/610; 345/156; 345/161

(58) Field of Classification Search .......... 318/568.11, 318/568.16, 560, 561, 609, 610, 400.17; 345/156, 161
See application file for complete search history.

(56) References Cited

U.S. PATENT DOCUMENTS

| | | | |
|---|---|---|---|
| 4,103,197 A | 7/1978 | Ikegami et al. | |
| 4,703,211 A | 10/1987 | Yazaki et al. | |
| 5,243,248 A | 9/1993 | Benford et al. | |
| 5,710,474 A | 1/1998 | Mulgrave | |
| 6,104,158 A * | 8/2000 | Jacobus et al. | 318/568.11 |
| 6,369,535 B1 * | 4/2002 | Wang et al. | 318/400.23 |
| 6,498,451 B1 | 12/2002 | Boules et al. | |
| 6,723,106 B1 | 4/2004 | Charles et al. | |
| 6,909,205 B2 | 6/2005 | Corcoran et al. | |
| 7,592,764 B2 * | 9/2009 | Vermeir et al. | 318/375 |
| 7,658,249 B2 * | 2/2010 | Buglione et al. | 180/65.31 |
| 2002/0097223 A1 * | 7/2002 | Rosenberg | 345/157 |
| 2003/0193475 A1 * | 10/2003 | Rosenberg et al. | 345/156 |
| 2004/0027332 A1 | 2/2004 | Cope et al. | |

(Continued)

FOREIGN PATENT DOCUMENTS

EP    1628176 A2    2/2006

*Primary Examiner*—Paul Ip
(74) *Attorney, Agent, or Firm*—Ingrassia Fisher & Lorenz, P.C.

(57) ABSTRACT

An aircraft user interface haptic feedback system includes a user interface, a position sensor, a cogless motor, and a control circuit. The user interface is movable to a position. The position sensor senses the position of the user interface and supplies a user interface position signal. The cogless motor is coupled to the user interface, and receives motor drive signals. The cogless motor, in response to the motor drive signals, supplies feedback force to the user interface. The control circuit receives at least the user interface position signal and a signal representative of the motor current and is operable, in response to at least these signals, to control the motor current supplied to the cogless motor using a non-trapezoidal motor commutation scheme.

12 Claims, 5 Drawing Sheets

U.S. PATENT DOCUMENTS

| | | |
|---|---|---|
| 2004/0100440 A1 | 5/2004 | Levin et al. |
| 2005/0080495 A1 | 4/2005 | Tessier et al. |
| 2005/0173595 A1 | 8/2005 | Hoh |
| 2005/0195168 A1* | 9/2005 | Rosenberg et al. .......... 345/161 |
| 2006/0176272 A1* | 8/2006 | Rosenberg ................. 345/156 |
| 2006/0187197 A1* | 8/2006 | Peshkin et al. ............... 345/156 |
| 2007/0296366 A1* | 12/2007 | Quaid et al. ........... 318/568.16 |
| 2008/0100252 A1* | 5/2008 | Tillotson .................... 318/628 |
| 2009/0128072 A1* | 5/2009 | Strong et al. ........... 318/400.17 |
| 2010/0039373 A1* | 2/2010 | Braun et al. ................. 345/156 |

* cited by examiner

COGLESS MOTOR DRIVEN ACTIVE USER INTERFACE HAPTIC FEEDBACK SYSTEM

CROSS-REFERENCES TO RELATED APPLICATIONS

This application claims the benefit of U.S. Provisional Application Nos. 60/854,763 and 60/854,764, both filed Oct. 26, 2006, and U.S. Provisional Application No. 60/859,389, filed Nov. 14, 2006.

TECHNICAL FIELD

The present invention relates to aircraft flight control systems and, more particularly, to a cogless motor driven user interface haptic feedback system for aircraft control systems.

BACKGROUND

Aircraft typically include a plurality of flight control surfaces that, when controllably positioned, guide the movement of the aircraft from one destination to another. The number and type of flight control surfaces included in an aircraft may vary, but typically include both primary flight control surfaces and secondary flight control surfaces. The primary flight control surfaces are those that are used to control aircraft movement in the pitch, yaw, and roll axes, and the secondary flight control surfaces are those that are used to influence the lift or drag (or both) of the aircraft. Although some aircraft may include additional control surfaces, the primary flight control surfaces typically include a pair of elevators, a rudder, and a pair of ailerons, and the secondary flight control surfaces typically include a plurality of flaps, slats, and spoilers.

The positions of the aircraft flight control surfaces are typically controlled using a flight control surface actuation system. The flight control surface actuation system, in response to position commands that originate from either the flight crew or an aircraft autopilot, moves the aircraft flight control surfaces to the commanded positions. In most instances, this movement is effected via actuators that are coupled to the flight control surfaces.

Typically, the position commands that originate from the flight crew are supplied via some type of input control mechanism. For example, many aircraft include duplicate yoke and pedal mechanisms, one for the pilot and one for the co-pilot. Either mechanism can be used to generate desired flight control surface position commands. More recently, however, aircraft are being implemented with side stick type mechanisms to replace the yoke. Most notably in aircraft that employ a fly-by-wire system. Similar to the traditional yoke mechanisms, it is common to include multiple side sticks in the cockpit, one for the pilot and one for the co-pilot. In some implementations, one or more orthogonally arranged springs are used to provide a centering force. In other implementations, one or more electric motors supply force feedback (or "haptic feedback") to the user, be it the pilot or the co-pilot. Similarly the pedals may have springs for return to neutral, or motors to provide haptic feedback.

Although the above-described force feedback mechanisms are generally safe and reliable, each does suffer certain drawbacks. For example, the feedback mechanisms may not provide variable force feedback based on actual aircraft conditions. Moreover, the electric motor implementations are usually provided in double or triple redundant arrangements, which can increase overall system size, weight, and costs, and may be implemented with slotted brushless DC motors, which experience a phenomenon that is generally referred to as cogging.

Hence, there is a need for a pilot side stick feedback mechanism that provides variable force feedback based on actual aircraft conditions and/or that can be implemented with relatively lightweight and/or relatively inexpensive components and/or that provides variable force feedback using an electric motor that does not experience the oscillations that may occur as a result of cogging. The present invention addresses one or more of these needs. The present invention addresses one or more of these needs.

BRIEF SUMMARY

In one embodiment, and by way of example only, an aircraft user interface haptic feedback system includes a user interface, a position sensor, a cogless motor, and a control circuit. The user interface is configured to receive user input and, upon receipt thereof, to move to a position. The position sensor is coupled to, and is configured to sense the position of, the user interface. The position sensor is further configured to supply a user interface position signal representative of the user interface position. The cogless motor is coupled to the user interface and to receive motor current. The cogless motor, upon receipt of the motor current, supplies a feedback force to the user interface at a magnitude proportional to the motor current. The control circuit is coupled to receive at least the user interface position signal and a signal representative of the motor current and is operable, in response to at least these signals, to control the motor current supplied to the cogless motor using a non-trapezoidal motor commutation scheme.

Other independent features and advantages of the preferred aircraft user interface haptic feedback system will become apparent from the following detailed description, taken in conjunction with the accompanying drawings which illustrate, by way of example, the principles of the invention.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although much of the invention is depicted and described as being implemented for aircraft primary flight control surfaces, it will be appreciated that it may also be implemented, for example, for one or more aircraft secondary flight control surfaces, for aircraft brakes, for aircraft flight simulators, for controlling unmanned autonomous vehicles (UAVs), for speed brake control, throttle quadrant control, for refueling booms, and/or nose wheel steering. Moreover, although fixed-wing aircraft are depicted and described herein, the invention may also be used in rotary-wing aircraft.

Figure 1:
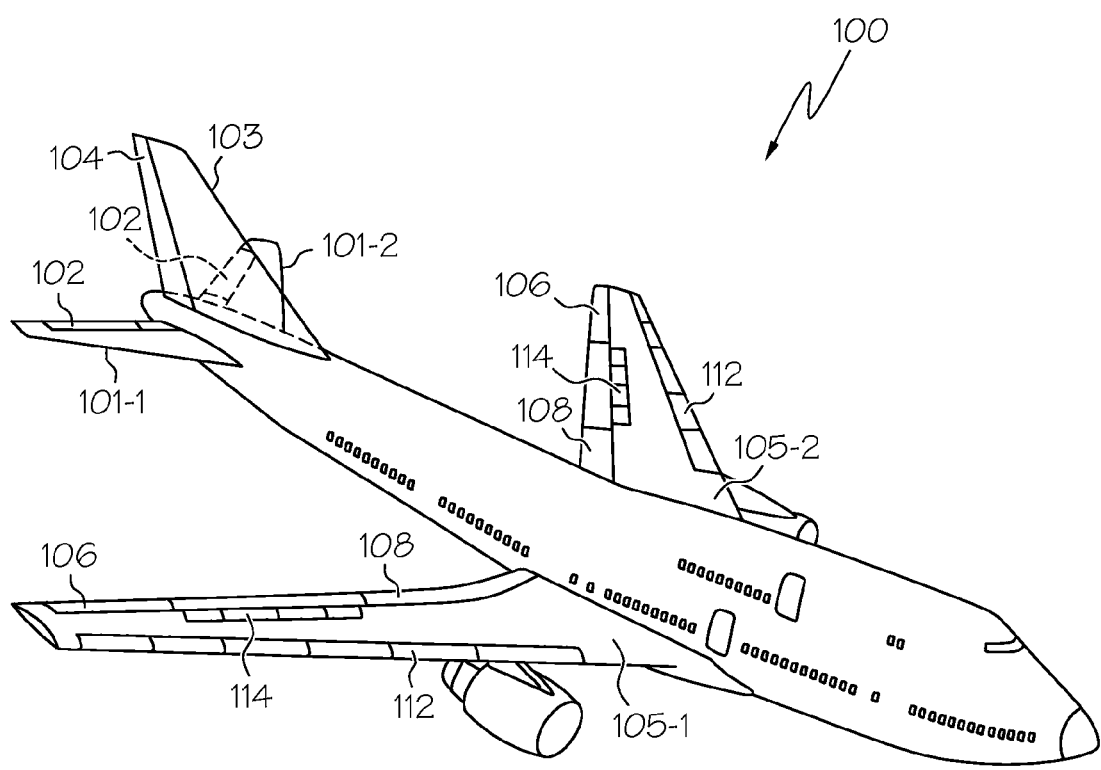
FIG. 1 is a perspective view of an exemplary aircraft depicting primary and secondary flight control surfaces.

Turning now to FIG. 1, a perspective view of an exemplary aircraft is shown. In the illustrated embodiment, the aircraft 100 includes first and second horizontal stabilizers 101-1 and 101-2, respectively, a vertical stabilizer 103, and first and second wings 105-1 and 105-2, respectively. An elevator 102 is disposed on each horizontal stabilizer 101-1, 101-2, a rudder 104 is disposed on the vertical stabilizer 103, and an aileron 106 is disposed on each wing 105-1, 105-2. In addition, a plurality of flaps 108, slats 112, and spoilers 114 are disposed on each wing 105-1, 105-2. The elevators 102, the rudder 104, and the ailerons 106 are typically referred to as the primary flight control surfaces, and the flaps 108, the slats 112, and the spoilers 114 are typically referred to as the secondary flight control surfaces.

The primary flight control surfaces 102-106 control aircraft movements about the aircraft pitch, yaw, and roll axes. Specifically, the elevators 102 are used to control aircraft movement about the pitch axis, the rudder 104 is used to control aircraft movement about the yaw axis, and the ailerons 106 control aircraft movement about the roll axis. It is noted, however, that aircraft movement about the yaw axis can also be achieved by varying the thrust levels from the engines on opposing sides of the aircraft 100.

The secondary control surfaces 108-114 influence the lift and drag of the aircraft 100. For example, during aircraft take-off and landing operations, when increased lift is desirable, the flaps 108 and slats 112 may be moved from retracted positions to extended positions. In the extended position, the flaps 108 increase both lift and drag, and enable the aircraft 100 to descend at a lower airspeed, and also enable the aircraft 100 get airborne over a shorter distance. The slats 112, in the extended position, increase lift, and are typically used in conjunction with the flaps 108. The spoilers 114, on the other hand, reduce lift and when moved from retracted positions to extended positions, which is typically done during aircraft landing operations, may be used as air brakes to assist in slowing the aircraft 100.

Figure 2:
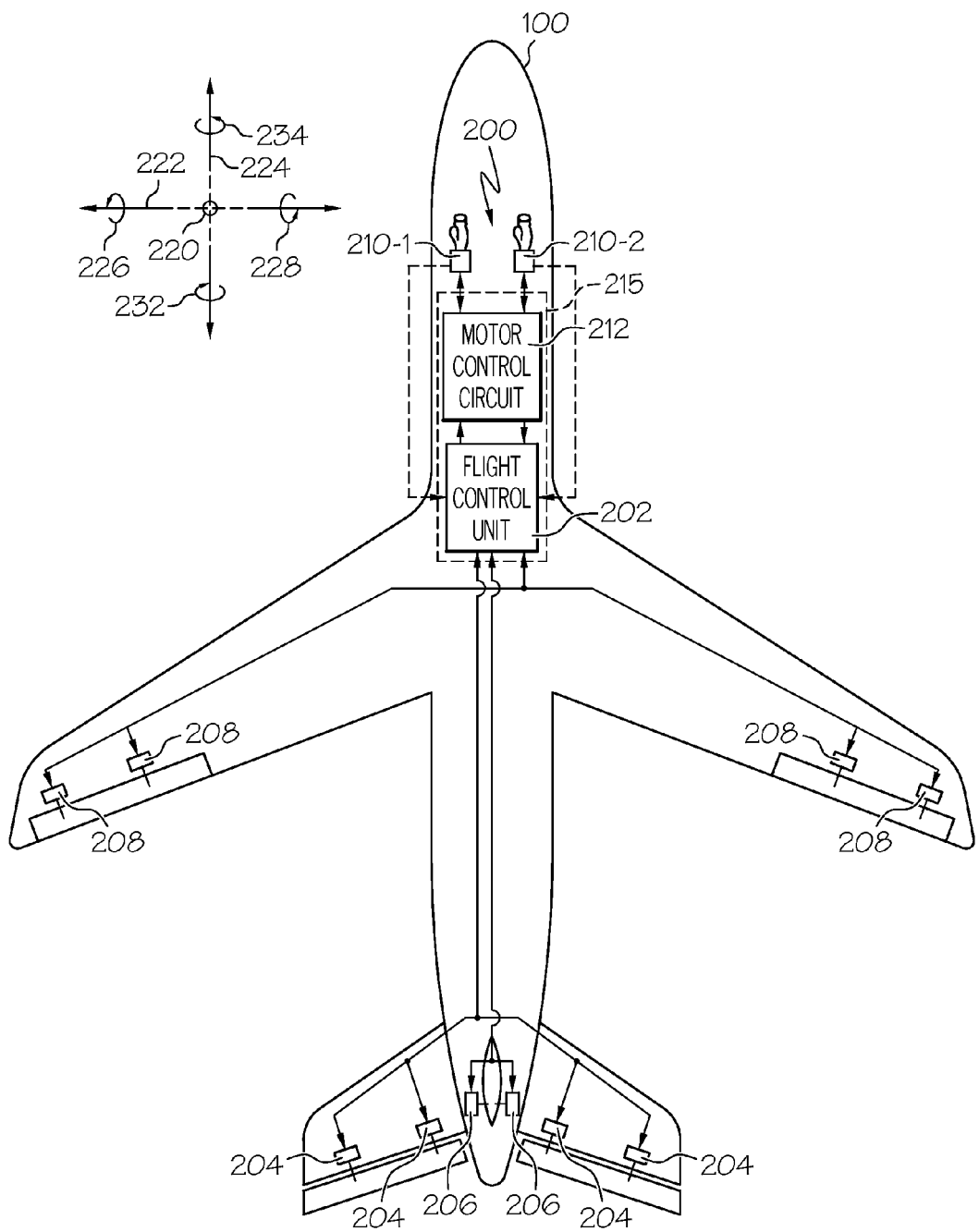
FIG. 2 is a schematic depicting portions of an exemplary flight control surface actuation system according one embodiment of the present invention.

The flight control surfaces 102-114 are moved to commanded positions via a flight control surface actuation system 200, an exemplary embodiment of which is shown in FIG. 2. In the depicted embodiment, the flight control surface actuation system 200 includes one or more flight control units 202, a plurality of primary flight control surface actuators, which include elevator actuators 204, rudder actuators 206, and aileron actuators 208. It will be appreciated that the system 200 may be implemented with more than one flight control unit 202. However, for ease of description and illustration, only a single, multi-channel control unit 202 is depicted. It will additionally be appreciated that one or more functions of the flight control unit 202 could be implemented using a plurality of devices.

Before proceeding further, it is noted that the flight control surface actuation system 200 additionally includes a plurality of secondary control surface actuators, such as flap actuators, slat actuators, and spoiler actuators. However, the operation of the secondary flight control surfaces 108-114 and the associated actuators is not needed to fully describe and enable the present invention. Thus, for added clarity, ease of description, and ease of illustration, the secondary flight control surfaces and actuators are not depicted in FIG. 2, nor are these devices further described. Moreover, controls for the rudder 104 and non-illustrated aircraft brakes are also not included in FIGS. 2 and 3 for clarity and ease of description. Nonetheless, it will be appreciated that the invention may be applied to rudder and brakes controls in a similar fashion.

Returning now to the description, the flight control surface actuation system 200 may additionally be implemented using various numbers and types of primary flight control surface actuators 204-208. In addition, the number and type of primary flight control surface actuators 204-208 per primary flight control surface 102-106 may be varied. In the depicted embodiment, however, the system 200 is implemented such that two primary flight control surface actuators 204-208 are coupled to each primary flight control surface 102-106. Moreover, each of the primary flight control surface actuators 204-208 are preferably a linear-type actuator, such as, for example, a ballscrew actuator or hydraulic cylinder. It will be appreciated that this number and type of primary flight control surface actuators 204-208 are merely exemplary of a particular embodiment, and that other numbers and types of actuators 204-208 could also be used.

No matter the specific number, configuration, and implementation of the flight control units 202 and the primary flight control surface actuators 204-208, the flight control unit 202 is configured to receive aircraft flight control surface position commands from one or more input control mechanisms. In the depicted embodiment, the system 200 includes two user interfaces, a pilot user interface 210-1 and a co-pilot user interface 210-2, and one or more motor control circuits 212. As will be described in more detail below, the pilot 210-1 and co-pilot 210-2 user interfaces may both be implemented as flight control sticks. It will be appreciated that in some embodiments the system 200 could be implemented with more or less than this number of flight control sticks 210. Moreover, and as was alluded to above, the user interface 210 (or user interfaces) could be implemented as rudder/brake pedals.

It will additionally be appreciated that the system could be implemented with more than one motor control circuit 212, and that each flight control unit 202 and each motor control circuit 212 could be integrated into a control circuit 215, as depicted in phantom in FIG. 2. Nonetheless, the motor control circuit 212, in response to position signals supplied from one or both flight control sticks 210, supplies flight control surface position signals to the flight control unit 202. The flight control unit 202, in response to the flight control surface position signals, supplies power to the appropriate primary flight control surface actuators 204-208, to move the appropriate primary flight control surfaces 102-106 to positions that will cause the aircraft 100 to implement the commanded maneuver. As depicted in phantom in FIG. 2, in other embodiments the system 200 can be configured such that one or more signals from the user interfaces 210, such as the just-mentioned position signals, are supplied directly to the flight control unit 202, or are supplied to one or more aircraft data buses for communication to the flight control unit 202.

Figure 3:
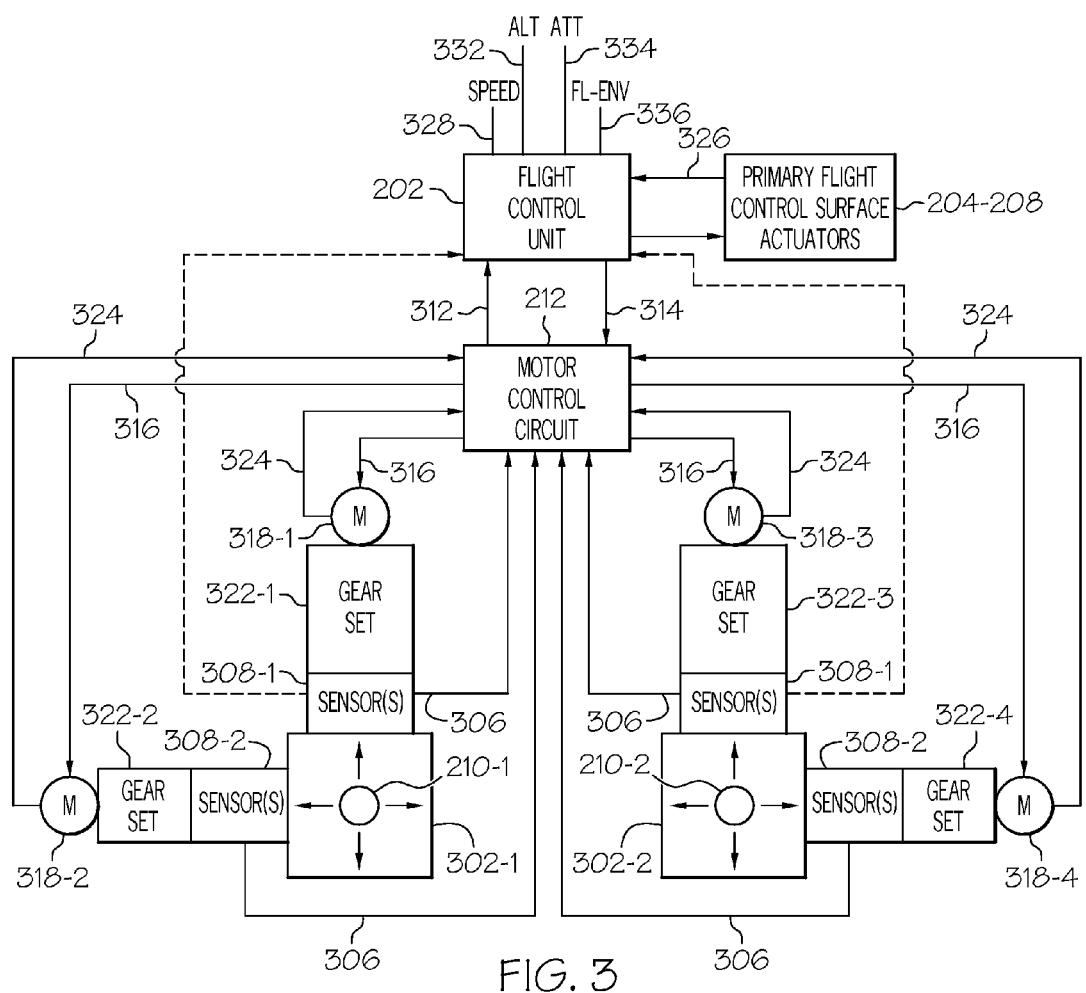
FIG. 3 is a functional block diagram of the flight control surface actuation system of FIG. 2, depicting certain portions thereof in slightly more detail.

Turning now to FIG. 3, which is also a functional block diagram of the flight control surface actuation system 200 depicting portions thereof in slightly more detail, the flight control sticks 210 are each coupled to a gimbal assembly 302 (e.g., 302-1, 302-2), and are each configured to move, in response to input from either a pilot or a co-pilot, to a control position in a rotational direction. Although the configuration of the flight control sticks 210 may vary, in the depicted embodiment, and with quick reference to FIG. 2, each flight control stick 210 is configured to rotate, from a null position 220 to a control position, about two perpendicular rotational axes, which in the depicted embodiment are a pitch axis 222 and a roll axis 224. More specifically, if the pilot or co-pilot moves the flight control stick 210 in a forward direction 226 or an aft direction 228, to thereby control aircraft pitch, the flight control stick 210 rotates about the pitch axis 222. Similarly, if the pilot or co-pilot moves the flight control stick 210 in a port direction 232 or a starboard direction 234, to thereby control aircraft roll, the flight control stick 210 rotates about the roll axis 224. It will additionally be appreciated that the flight control stick 210 may be moved in a combined forward-port direction, a combined forward-starboard direction, a combined aft-port direction, or a combined aft-starboard direction, and back to or through the null position 220, to thereby implement a combined aircraft pitch and roll maneuver.

Returning once again to FIG. 3, the flight control sticks 210, as noted above, are each configured to supply position and/or force signals 306 to either the motor control circuit 212, the flight control unit 202, or both, that are representative of its position and/or the force applied thereto. To do so, two or more position sensors and/or two or more force sensors 308 (e.g., 308-1, 308-2) are coupled to each flight control stick 210. It will be appreciated, however, that more or less than this number of position and/or forces sensors could be used. No matter the specific number of position and/or force sensors, it will be appreciated that the sensors 308 may be implemented using any one of numerous types of position sensors and/or force sensors. For example, the position sensors, if included, may be implemented using RVDTs, LVDTs, potentiometers, or optical sensors, just to name a few, and the force sensors, if included, may be implemented using strain gage sensors, piezoelectric sensors, semiconductor sensors, or optical sensors, just to name a few. The motor control circuit 212, at least in some embodiments, upon receipt of the position and/or force signals 306, supplies flight control surface position signals 312 to the flight control unit 202, which in turn supplies power to the appropriate primary flight control surface actuators 204-208, to move the appropriate primary flight control surfaces 102-106 to the appropriate positions, to thereby implement a desired maneuver. Alternatively, and as mentioned above and as depicted in phantom in FIG. 3, the flight control unit 202 may receive the position and/or force signals 306 directly from the sensors 308 and, in response, supply power to the appropriate primary flight control surface actuators 204-208, to move the appropriate primary flight control surfaces 102-106 to the appropriate positions. The flight control unit 202 may additionally include an auto-pilot, which may process the control surface commands before the commands are supplied to the primary flight control surface actuators 204-208. Also, the flight control surface position signals 312 supplied from the motor control circuit 212 to the flight control unit 202 may be based on an average of pilot and co-pilot stick positions 210.

As FIG. 3 additionally depicts, the motor control circuit 212 may also preferably receive one or more force feedback influence signals 314 from the flight control unit 202, and supplies motor drive signals 316 to one or two pilot motors 318-1, 318-2, or one or two co-pilot motor 318-3, 318-4, or various combinations thereof. The motors 318, which are each coupled to one of the flight control sticks 210 via associated gear sets 322 (e.g., 322-1, 322-2, 322-3, 322-4), are each operable, upon receipt of the motor drive signals 316, to supply a feedback force to the associated flight control stick 210. As will be described in more detail further below, the motor drive signals 316 are variable in magnitude, based on the position of the flight control sticks 210, the slew rate of the flight control sticks 210, and various aircraft and control surface conditions, as represented by the one or more feedback influence signals 314. The motor drive signals 316 supplied to the pilot flight control stick 210-1 is also preferably variable in magnitude based on the position of the co-pilot flight control stick 210-2, and vice-versa. The flight control sticks 210, in response to the feedback force supplied from the associated motors 318, supplies haptic feedback to the pilot or co-pilot, as the case may be.

Figure 4:
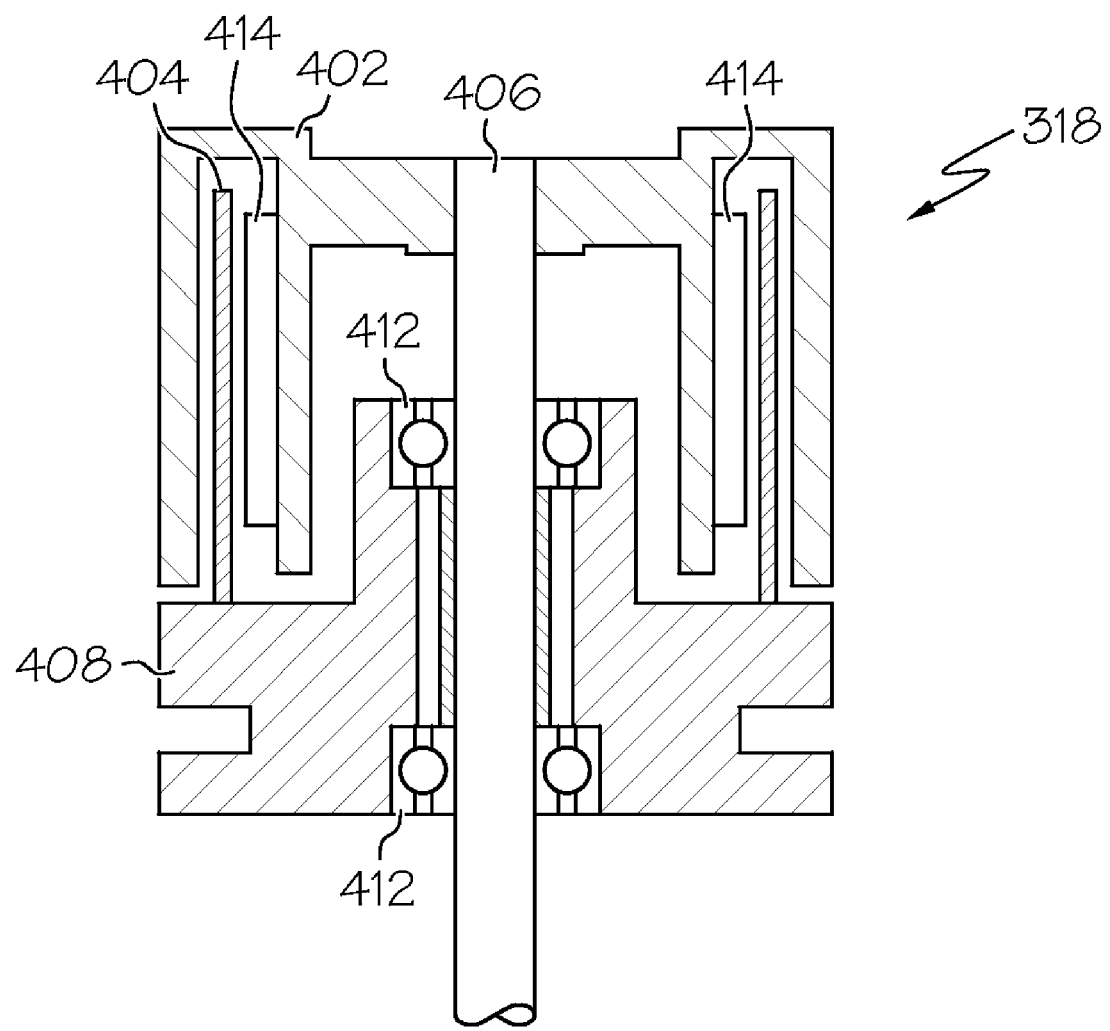
FIG. 4 is a cross section view of an exemplary slotless brushless motor that may be used to implement the system of FIG. 1.

Preferably, the motors 318 are each implemented using permanent magnet cogless brushless machines. As such, current feedback and commutation signals 324 are supplied to the motor control circuit 212. A cogless (or slotless) brushless machine does not exhibit the same torque ripple effects as slotted motors, exhibits at least a substantially linear current versus torque relationship, and a relatively high torque to inertia ratio. Although numerous types of cogless motors exist, in a particular embodiment a cogless brushless motor developed and sold by ThinGap Corporation may be used. An embodiment of an exemplary cogless motor is depicted in FIG. 4 and, for completeness, will be briefly described before further describing the system 200.

The motor 318 includes a rotor 402 and a stator 404. The rotor 402 is coupled to a shaft 406 that is rotationally mounted on a support structure 408 via a plurality of bearing assemblies 412. The rotor 402 is preferably constructed, at least in part, of a ferromagnetic material, and has a plurality of permanent magnets 414 coupled thereto. The rotor 402 at least partially surrounds, and is spaced apart from, the stator 404. The stator 404 includes one or more coils that are not wound within teeth of a lamination structure. This may be implemented using any one of numerous known configurations. In the depicted embodiment, however, the stator 404 is implemented as a freestanding coil made of a copper sheet and glass-fiber composite. The stator 404 is coupled to receive current from, for example, the motor control circuit 212 that generates a rotating magnetic field with the stator 404. The rotor 402, in response to the rotating magnetic field, rotates and supplies a feedback force, via the shaft 406, to the appropriate flight control stick 210.

Returning once again to FIG. 3, the flight control unit 202, as noted above, may also supply one or more force feedback influence signals 314 to the motor control circuit 212. The force feedback influence signals 314, as was also noted above, vary in dependence upon various aircraft conditions. As such, and as FIG. 3 additionally depicts, the flight control unit 202 receives a plurality of signals representative of aircraft conditions. Although the specific number of signals, and the conditions of which each signal is representative of, may vary, in the depicted embodiment, these signals include primary flight control surface position signals 326, aircraft speed 328, aircraft altitude 332, and aircraft attitude 334. In addition, the flight control unit 202 may also receive a signal representative of aircraft operating envelope 336. It will be appreciated that one or more of these signals may be supplied from individual sensors that are dedicated to the system 200 or shared with other systems in the aircraft, or supplied via one or more data buses within the aircraft. No matter the specific source of each signal that is supplied to the flight control unit 202, the control unit 202 is further operable, in response to one or more of these signals 326-336, to supply the force feedback influence signals 314 to the motor control circuit 212. The force feedback influence signals 314, like the motor drive signals 316, are preferably variable in magnitude, based on the aircraft and control surface conditions, as represented by each of the aircraft condition signals 328-336, and the control surface position signals 326.

Figure 5:
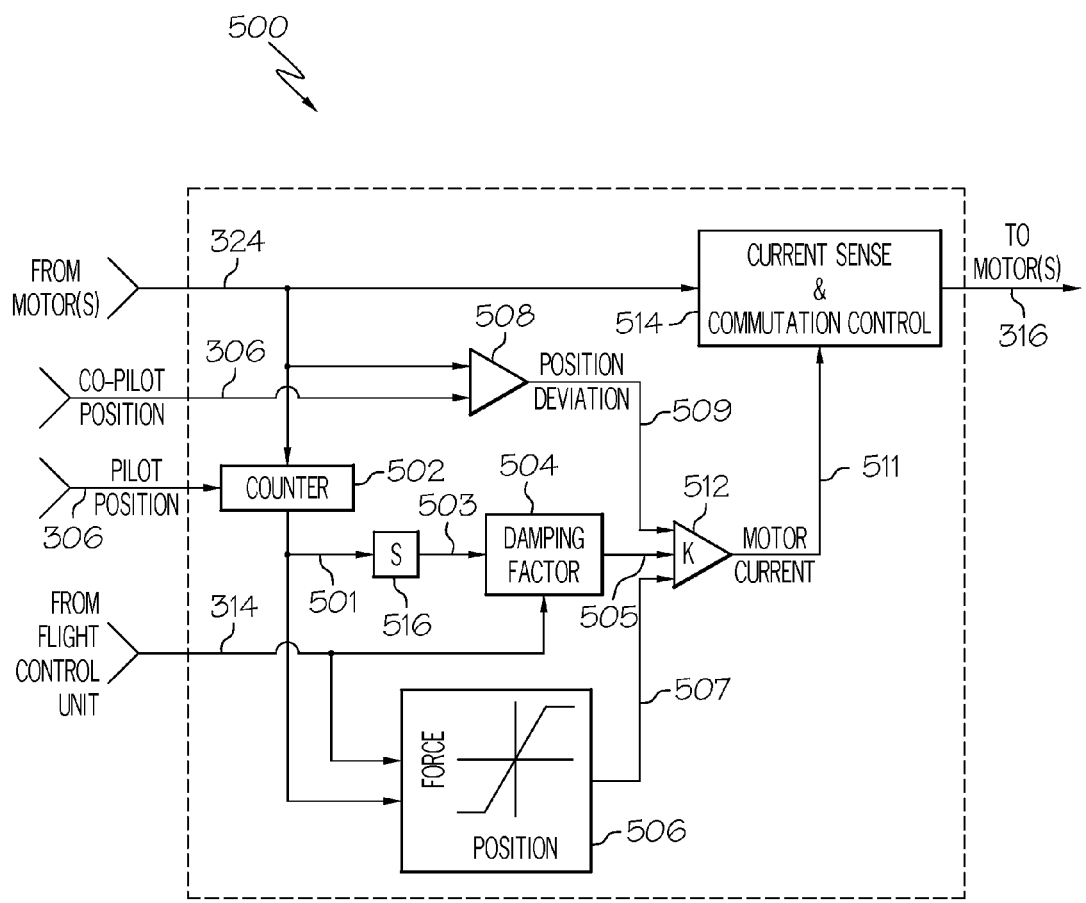
FIG. 5 is a functional block diagram of one channel of an exemplary embodiment of the motor control circuit that may be used to implement the system of FIG. 2.

Turning now to FIG. 5, a functional block diagram of one channel of an exemplary embodiment of the motor control circuit 212 is depicted and will be described. The depicted motor control circuit channel 500, which is associated with the pilot user interface 210-1, includes a counter 502, a position deviation determination function 504, a force versus position determination function 506, a damping factor function 508, a motor current command function 512, and a current sense and commutation control function 514. The counter 502 is coupled to receive a signal representative of the position of the motor rotor 402 and the position signal 306 from one of the position sensors 308. This motor rotor position signal, as depicted in FIG. 5, forms part of the above-described current sense and commutation control signals 324 supplied from the motors 308. The counter 502 compares the two position signals to ensure that the motor rotor position accurately reflects that of the user interface 210, and supplies a commanded position signal 501 based on either, or both, the motor rotor position signal or the pilot user interface position signal.

The commanded position signal 501 from the counter 502 is supplied to the damping factor function 504, via a differentiator 516. The differentiator 516 differentiates the position signal 501, and supplies a velocity signal 503 representative of the rate of change of position to the damping factor function 504. The damping factor function 504, in response to the velocity signal 503, determines and supplies a damping factor signal 505 representative of a damping factor to appropriately dampen the system 200. The differentiator 516 and damping factor function 504 may be implemented using any one of numerous known analog and/or digital circuits or circuit devices.

The commanded position signal 501 from the counter 502 is also supplied to force versus position determination function 506. The force versus position determination function 506 additionally receives the force feedback influence signals 314 from the flight control unit 202. It will be appreciated that one or more other sources could supply one or more of the flight condition signals in addition to or instead of the flight control unit. In either case, the force versus position determination function 506, in response to the commanded position signal 503 and the force feedback influence signal 314, supplies a force feedback signal 507 to the motor current command function 512 that is representative of the desired feedback force to be supplied to the user interface 210.

The position deviation function 508 receives a signal representative of the position of the co-pilot user interface 210-2, and a signal representative of the pilot user interface 210-2. It will be appreciated that the signals representative of the pilot and co-pilot user interfaces 210-1, 210-2 may be the position signals 306 supplied from the associated position sensors 308 or the position signals 324 supplied from the associated motors 318. In the depicted embodiment, the position signal representative of the co-pilot user interface position is supplied from one or more of the associated position sensors 308, and the pilot user interface position is supplied from the associated motor 318. In any case, the position deviation function 508 determines whether there is a deviation between the two user interfaces 210-1, 210-2 and, if there is, supplies a deviation signal 509 representative thereof to the motor current command function 512.

The motor current command function 512 is coupled to receive the damping factor signal 505, the force feedback signal 507, and the deviation signal 506 from the damping factor function 504, the force versus position function 506, and the position deviation function 508, respectively. The motor current command function 512, based on these signals, supplies a motor current command signal 511 to the current sense and commutation control function 514. The motor current command signal 511 is representative of the motor current to be supplied to the appropriate motor 318.

The current sense and commutation control function 514 is configured to properly commutate the appropriate motor 318. Although any one of numerous commutation schemes may be used, in a particular preferred embodiment the current sense and commutation control function 514 implements a non-trapezoidal commutation scheme, such as sine commutation. As FIG. 5 depicts, the current sense and commutation control function 514 receives the current sense and commutation control signals 324 from the appropriate motor 318 and the motor current command signal 511 from the motor current command function 512. In response to these signals the current sense and commutation control function 514 supplies the motor drive signals 316 current to the appropriate motor 318 to thereby control the feedback force supplied to the user interface 210-1.

It will once again be emphasized that although the user interface haptic feedback system was, for clarity and ease of depiction and description, described in the context of fixed-wing aircraft secondary flight control surface control, it will be appreciated that the system may also be used in rotary-wing aircraft, and may also be implemented in the context the control of one or more aircraft primary flight control surfaces, aircraft brakes, for use with aircraft flight simulators, for controlling unmanned autonomous vehicles (UAVs), for aircraft speedbrake and throttle quadrant, for refueling booms, and/or for nose wheel steering, just to name a few.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft user interface haptic feedback system, comprising:
   a user interface configured to receive user input and, upon receipt thereof, to move to a position;
   a position sensor coupled to, and configured to sense the position of, the user interface, the position sensor further configured to supply a user interface position signal representative of the user interface position;
   a cogless motor coupled to the user interface, the cogless motor further coupled to receive motor current and operable, upon receipt thereof, to supply a feedback force to the user interface at a magnitude proportional to the motor current; and
   a control circuit coupled to receive at least the user interface position signal and a signal representative of the motor current and operable, in response to at least these signals, to control the motor current supplied to the cogless motor using a non-trapezoidal motor commutation scheme.

2. The system of claim 1, wherein:
   the motor comprises a stator and a rotor, the rotor coupled to the user interface; and the position sensor is coupled to the motor rotor, whereby the position signal is further representative of the motor rotor position.

3. The system of claim 1, wherein the non-trapezoidal motor commutation scheme is a sine commutation scheme.

4. The system of claim 1, wherein the control circuit comprises:
a commutation control function coupled to receive (i) the position signal, (ii) the signal representative of the motor current, and (iii) a motor current command signal and operable, in response thereto, to supply the motor current to the motor.

5. The system of claim 4, wherein the control circuit further comprises:
a motor current command function coupled to receive (i) a force feedback signal representative of the feedback force and (ii) a damping factor signal representative of a damping factor and operable, in response thereto, to supply the motor current command signal.

6. The system of claim 5, wherein the control circuit further comprises:
a counter coupled to receive the position signal and operable, in response thereto, to supply an absolute position signal representative of user interface absolute position; and
a force versus position determination function coupled to receive the absolute position signal and operable, in response thereto, to supply the force feedback signal;
a differentiator coupled to receive the absolute position signal and operable, in response thereto, to supply a velocity signal representative of a rate of change of the absolute position; and
a damping factor function coupled to receive the velocity signal and operable, in response thereto, to supply the damping factor signal.

7. The system of claim 6, wherein:
the system is adapted for use in an aircraft; and
the force versus position determination function is further coupled to receive a signal representative of aircraft flight conditions and is further responsive thereto to supply the force feedback signal.

8. The system of claim 7, wherein the damping factor function is further coupled to receive the signal representative of aircraft flight conditions and is further responsive thereto to supply the damping factor signal.

9. The system of claim 8, wherein the user interface is a first user interface, the position signal is a first position signal, and wherein the control circuit further comprises:
a position deviation determination function coupled to receive (i) the first position signal and (ii) a second position signal that is representative of a second user interface position, the position determination function operable, in response to the first position signal and the second position signal, to supply a position deviation signal representative of a deviation between the first and second user interface positions.

10. The system of claim 9, wherein the motor current command function is coupled to receive the position deviation signal and is further responsive thereto to supply the motor current command signal.

11. The system of claim 1, further comprising:
a gear set coupled between the motor and the user interface.

12. The system of claim 1, wherein the user interface is selected from the group consisting of a flight control side stick, a rudder/brake pedal, a simulator user interface, a nose wheel steering mechanism, a speedbrake control, and throttle quadrant control.

* * * * *